United States Patent Office 2,913,591
Patented Nov. 17, 1959

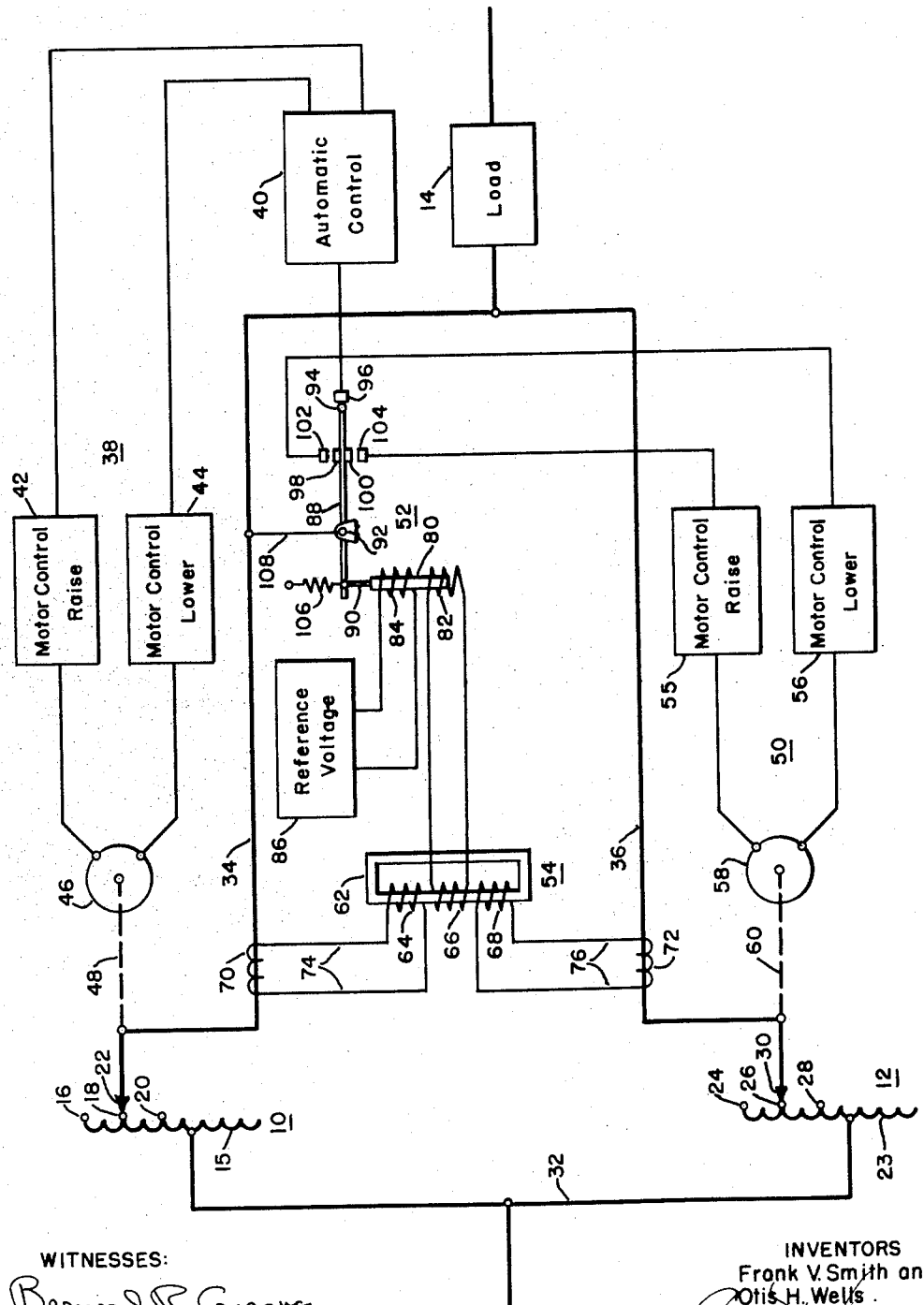

2,913,591
ELECTRICAL CONTROL APPARATUS

Frank V. Smith, Concord, and Otis H. Wells, Oakland, Calif., assignors to Westinghouse Electric Corporation, East Pittsburgh, Pa., a corporation of Pennsylvania Application May 16, 1956, Serial No. 585,349

4 Claims. (Cl. 307—51)

This invention relates to control means for controlling the operation of parallel connected voltage regulators and, more particularly, to control means for causing parallel connected load tap-changing transformers to stay in step with one another.

In many instances it is necessary to supply a load or loads from parallel connected load tap-changing transformers. However, when such tap-changing transformers are connected in parallel certain problems are presented. For instance, if the output voltage of the slave tap-changer transformer is higher or lower than the output voltage of the master tap-changer transformer there will be a circulating current between the two transformers. If this circulating current is excessive it will effect an overload of the transformers. Therefore, it is desirable to provide control means for maintaining the slave tap-changing transformer in step with the master tap-changing transformer.

The prior art teaches several different types of control means for maintaining tap-changing transformers in step with another; however, each of these prior art systems has certain disadvantages. For instance, many of these prior art control systems provide for locking out both the control system to the master tap-changer transformer and to the slave tap-changer transformer when the magnitude of the current circulating between the transformers becomes excessive. Such a prior art control system thus interrupts service to the load. Some of these prior art control systems for maintaining parallel connected tap-changing transformers in step with one another also provide mechanical camming means for effecting a locking out of the control means to the tap-changing transformers, which camming means presents certain maintenance problems.

A broad object of this invention is to provide for causing voltage regulators to operate in parallel and to stay in step so that no circulating current will flow between the units which are in parallel and thus prevent overloading of the transformers associated with the voltage regulators.

A more specific object of this invention is to maintain operation of a parallel operated slave voltage regulator even though it is not in step with the master voltage regulator and thus provide continuous service to the load associated therewith.

Another specific object of this invention is to provide for locking out the master tap-changer transformer and thus preventing the master unit from hunting which may result in excessive burning of the contacts when the slave tap-changer transformers are not able to follow the master unit.

A further object of this invention is to provide for minimizing the wiring between a master tap-changer transformer and the slave tap-changer transformers which are operated in parallel with the master tap-changer transformer.

Another object of this invention is to provide for rendering the paralleling controls between a master tap-changer transformer and the slave tap-changer transformers independent of the characteristics of the individual tap-changer transformers.

Another object of this invention is to provide for increasing the speed of response of a slave tap-changer transformer in assuming the same position as its parallel operated master tap-changer transformer.

A still further object of this invention is to provide a master tap-changer transformer which is operated in parallel with a slave tap-changer transformer and in which complete automatic control need only be provided for the master tap-changer transformer.

Other objects of this invention will become apparent from the following description in which the single figure of the drawing diagrammatically illustrates this invention.

Referring to the drawing, there is illustrated a master load tap-changing transformer or master voltage regulator 10 and a slave load tap-changing transformer or slave voltage regulator 12 which is connected for parallel operation with the master voltage regulator 10 to supply energy to a common load 14. However, it is to be understood that this invention is equally applicable to the paralleling of more than one slave voltage regulator with a master voltage regulator.

The master tap-changing transformer 10 is diagrammatically illustrated as an autotransformer and comprises a winding 15 which has electrically connected thereto a plurality of stationary contact members 16, 18 and 20 which are selectively engaged by a movable contact member 22. In like manner, the slave tap-changing transformer 12 is diagrammatically illustrated as an autotransformer and comprises a winding 23 which has electrically connected thereto stationary contact members 24, 26 and 28 which are selectively engaged by a movable contact member 30.

For purposes of simplicity the parallel connection between the master tap-changing transformer 10 and the slave tap-changing transformer 12 is shown in single line diagram form rather than showing the completed phases. In particular, the winding 15 of the master tap-changing transformer 10 is electrically connected to the winding 23 of the slave tap-changing transformer 12 by means of an electrical conductor 32. The parallel circuit is completed by electrically connecting the movable contact member 22 of the master tap-changing transformer 10 to the load 14 by means of an electrical conductor 34 and by electrically connecting the movable contact member 30 of the slave tap-changing transformer 12 to the load 14 by means of an electrical conductor 36.

In order to maintain the output voltage from the master tap-changing transformer 10 substantially constant, master control means 38 is provided. The master control means 38 is shown in block diagram form and comprises automatic control means 40 responsive to the magnitude of the output voltage of the master tap-changing transformer 10, motor control raise means 42 and motor control lower means 44 responsive to the control means 40, and a suitable motor 46 which is selectively controlled in response to the motor control raise means 42 and in response to the motor control lower means 44, the motor 46 being mechanically connected to the movable contact member 22 of the master tap-changing transformer 10 by means of a mechanical linkage 48. In operation the automatic control means 40 senses the magnitude of the output voltage of the master tap-changing transformer 10, as will be explained more fully hereinafter, and selectively controls either the operation of the motor control raise means 42 to cause a rotation of the motor 46 in such a direction as to move the movable contact member 22 in a direction to increase the magnitude of the output voltage of the master tap-changing transformer 10, or controls the operation of the motor control lower means 44 to cause a rotation of the motor 46 in the opposite direction to thereby move the movable contact member 22 in a direction to decrease the magnitude of the output voltage of the master tap-changing transformer 10.

Slave control means 50 is provided for increasing or decreasing the magnitude of the output voltage of the slave tap-changing transformer 12. As will be explained more fully hereinafter, the slave control means 50 co-operates with a directional relay 52 and with magnetic means 54 to maintain the slave tap-changing transformer 12 in step with the master tap-changing transformer 10 to thus prevent excessive circulating current between the master tap-changing transformer 10 and the slave tap-changing transformer 12 which excessive circulating current would overload these transformers. As shown in block diagram, the slave control means 50 comprises motor control raise means 55, motor control lower means 56, a motor 58, and a mechanical linkage 60 between the motor 58 and the movable contact member 30 of the slave tap-changing transformer 12. In operation, the motor control raise means 55 effects a rotation of the motor 58 in such a direction that by means of the mechanical linkage 60 the movable contact member 30 is moved in such a direction as to increase the magnitude of the output voltage of the slave tap-changing transformer 12. On the other hand, the motor control lower means 56 effects a rotation of the motor 58 in the opposite direction to thereby effect a movement of the movable contact member 30 in such a direction as to decrease the magnitude of the output voltage of the slave tap-changing transformer 12.

The magnetic means 54 cooperates with the directional relay 52 to effect a lockout of the master control means 38 when the circulating current between the master tap-changer transformer 10 and the slave tap-changer transformer 12 becomes excessive; and cooperates with the directional relay 52 to effect a raising or lowering of the output voltage of the slave tap-changer transformer 12 to bring it in step with the master tap-changer transformer 10 while the master control means 38 is locked out, the raising or lowering depending upon whether the output voltage of the slave tap-changer regulator 12 is above or below the magnitude of the output voltage of the master tap-changer transformer 10.

The magnetic means 54 comprises a magnetic core member 62 which has disposed in inductive relationship therewith windings 64, 66 and 68. In order to obtain a measure of the output current of the master tap-changer transformer 10, a current transformer 70 is disposed in inductive relationship with the electrical conductor 34. In like manner, in order to obtain a measure of the output current of the slave tap-changer transformer 12, a current transformer 72 is disposed in inductive relationship with the electrical conductor 36. Circuit means 74 is interconnected between the winding 64 of the magnetic means 54 and the current transformer 70 in order to render the winding 64 responsive to the measure of the output current of the master tap-changer transformer 10. On the other hand, circuit means 76 is interconnected between the winding 68 of the magnetic means 54 and the current transformer 72 in order to render the winding 68 responsive to the measure of the output current of the slave tap-changer transformer 12. The windings 64 and 68 are so disposed on the magnetic core member 62 and so interconnected with their respective current transformers 70 and 72 that the voltage induced across the winding 66 of the magnetic means 54 is only proportional to a measure of the current circulating between the master tap-changer transformer 10 and the slave tap-changer transformer 12. This can be better understood by considering that if the magnitude of the output voltage of the slave tap-changer transformer 12 is less than the magnitude of the output voltage of the master tap-changer transformer 10, then current circulates from the movable contact member 22 of the transformer 10 through the conductor 34 and the conductor 36 to the movable contact member 30 of the sleeve tap-changer transformer 12. In particular, the current flowing under such conditions through the conductor 34 is proportional to $I_{L1}$, the load current through the master tap-changer transformer plus $I_C$ the circulating current and the current flowing through the conductor 36 is proportional to $I_{L2}$, the load current through the slave tap-changer transformer minus $I_C$, the circulating current. Thus, the current flow through the winding 64 of the magnetic means 54 under such conditions is proportional to $I_{L1}+I_C$ and the current flow through the winding 68 is proportional to $I_{L2}-I_C$. Under such assumed conditions current flows into the upper end of the winding 64, as shown, while current is flowing into the lower end of the winding 68, as shown. Therefore, the effect of the $I_{L2}$ and the $I_{L2}$ is cancelled magnetically within the magnetic core member 62 and a voltage is induced across the winding 66 proportional to 2 $I_C$. Under the above assumed conditions current proportional to 2 $I_C$ flows out of the upper end of the winding 66, as shown.

On the other hand, if the magnitude of the output voltage of the slave tap-changer transformer 12 is greater than the magnitude of the output voltage of the master tap-changer transformer 10, then current circulates from the movable contact member 30 of the slave tap-changer transformer 12 through the conductor 36 and the conductor 34 to the movable contact member 22 of the master tap-changer transformer 10. Under the latter conditions, the current flow through the conductor 34 is proportional to $I_{L1}-I_C$ and the current flow through the conductor 36 is proportional to $I_{L2}+I_C$. Thus, under these latter conditions, current proportional to $I_{L1}-I_C$ flows into the upper end of the winding 64 of the magnetic means 54 while current proportional to $I_{L2}+I_C$ flows into the lower end of the winding 68. Thus, here again the effect of the $I_{L1}$ and $I_{L2}$ cancel one another and a current flows out of the lower end of the winding 66, as shown, proportional to 2 $I_C$.

The directional relay 52 will now be described. As diagrammatically illustrated, the directional relay 52 comprises a core member 80 which has disposed in inductive relationship therewith a control winding 82 and a reference winding 84, the control winding 82 being responsive to the output current from the winding 66 of the magnetic means 54 and the reference winding 84 being supplied from a substantially constant source 86 of alternating-current voltage. The directional relay 52 also comprises a beam member 88 which is pivoted about a point 90. The core member 80 is mechanically connected to the beam member 88 by means of a linkage 90, the portion of the beam member 88 from the pivot point 92 to the extreme right hand of the beam member 88, as shown, being constructed of an electrical conducting material.

In order to selectively energize and deenergize the automatic control means 40, a movable contact member 94 is electrically connected to the beam member 88 and is disposed to selectively engage and disengage a stationary contact member 96. The beam member 88 also has electrically connected thereto movable contact members 98 and 100 which engage and disengage stationary contact members 102 and 104 respectively in order to control the operation of the motor control lower means 56 and the motor control raise means 55 as will be explained more fully hereinafter. For the purpose of biasing the movable contact member 94 of the relay 52 to the closed position with respect to the stationary contact member 96 when no current is flowing through the control winding 82 of the directional relay 52, a biasing spring 106 is provided. Thus, the spring 106 offsets the effect produced by the current flow through the reference winding 84.

The operation of the apparatus shown in the drawing will now be described. Assuming the magnitude of the output voltage of the master tap-changer transformer 10 is equal to the magnitude of the output voltage of the slave tap-changer transformer 12 then there is substantially no circulating current flowing between the transformers 10 and 12. Under such conditions, only current proportional to $I_{L1}$ and $I_{L2}$ will flow into the windings 64 and 68, respectively, of the magnetic means 54 and the effect of these currents will be cancelled out magnetically in the magnetic core member 62 and there will be substantially no output current from the winding 66 of the magnetic means 54. Therefore, the movable contact member 94 of the directional relay 52 will remain in engagement with the stationary contact member 96 and the master control means 38 will operate to maintain the output voltage of the master tap-changer transformer 10 substantially constant.

Assuming the magnitude of the output voltage of the slave tap-changer transformer 12 becomes less than the magnitude of the output voltage of the master tap-changer transformer 10, then current will circulate from the movable contact member 22 of the master tap-changer transformer 10 through the conductors 34 and 36 to the movable contact member 30 of the master tap-changer transformer 12 to effect an output current from the winding 66 of the magnetic means 54, as hereinbefore explained. This current flow from the upper end of the winding 66, as shown, will effect a pivoting of the beam member 88 of the directional relay 52 in such a direction as to bring the movable contact member 100 into engagement with the stationary contact member 104. This latter action completes an energizing circuit to the motor control raise means 55 which extends from the conductor 34 through a conductor 108, the beam member 88, and the contact members 100 and 104, to the motor control raise means 55. When an energizing circuit is completed to the motor control raise means 55 the motor 58 rotates in such a direction as to effect a movement of the movable contact member 30 of the slave tap-changer transformer 12 to thus increase the magnitude of the output voltage of the transformer 12 until it is of the same magnitude as the output voltage of the master tap-changer transformer 10.

It is to be noted that when the directional relay 52 is actuated so that the contact members 100 and 104 are brought into engagement, the movable contact member 94 disengages the stationary contact member 96 and thus locks out the master control means 38 since it opens up the energizing circuit to the automatic control means 40. This latter action prevents the automatic control means 38 from effecting a further movement of the movable contact member 22 of the master tap-changer transformer 10 until the slave tap-changer transformer 12 is brought into step with the transformer 10.

Assuming the magnitude of the output voltage of the slave tap-changer transformer increases to a value above the output voltage of the master tap-changer transformer 10, then current circulates from the movable contact member 30 through the conductors 36 and 34 to the movable contact member 22 of the master tap-changer transformer 10. Under such conditions, as was explained hereinbefore, current flows from the lower end of the winding 66 of the magnetic means 54, as shown, through the control winding 82 of the directional relay 52, to thereby effect an engagement of the movable contact member 98 of the directional relay 52 with the stationary contact member 102. This latter action completes an energizing circuit to the motor control lower means 56 which extends from the conductor 34 through the conductor 108, the beam member 88, and the contact members 98 and 102, to the motor control lower means 56. When an energizing circuit has been established to the motor control lower means 56, the motor 58 is caused to rotate in such a direction as to lower the magnitude of the output voltage of the slave tap-changer transformer 12 until it is equal in value to the output voltage of the master tap-changer transformer 10.

When the movable contact member 98 is brought into engagement with the stationary contact member 102, the movable contact member 94 disengages the stationary contact member 96 and thus interrupts the energizing circuit to the automatic control means 40, to thereby lock out the master control means 38 and prevent it from effecting further movement of the movable contact member 22 of the transformer 10 until the transformer 12 has been brought into step with the transformer 10.

Since numerous changes may be made in the above-described apparatus and circuits, and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. In a control system for maintaining parallel operation between a master regulator and a slave regulator, the combination comprising, means for obtaining a measure of the output current of the master regulator, means for obtaining a measure of the output current of the slave regulator, magnetic means including a magnetic core member and three windings disposed in inductive relationship with the magnetic core member, circuit means for rendering one of said three windings responsive to the measure of the output current of the master regulator, other circuit means for rendering another of said three windings responsive to the measure of the output current of the slave regulator, said one of said three windings and said another of said three windings being so disposed on the magnetic core member that the last of said three windings has a voltage induced thereacross which is only proportional to a measure of the current circulating between the master regulator and the slave regulator, a control circuit for said master regulator, a control circuit for said slave regulator, relay means, said relay means normally closing said control circuit for said master regulator, and means applying the output of said last of said three windings to said relay means, said relay means being responsive to the output of said last of said three windings to open said control circuit for said master regulator and close said control circuit to said slave regulator to bring said slave regulator in step with said master regulator.

2. In a control system for maintaining parallel operation between a master regulator and a slave regulator, the combination comprising, means for obtaining a measure of the output current of the master regulator, means for obtaining a measure of the output current of the slave regulator, magnetic means including a magnetic core member and three windings disposed in inductive relationship with the magnetic core member, circuit means for rendering one of said three windings responsive to the measure of the output current of the master regulator, other circuit means for rendering another of said three windings responsive to the measure of the output current of the slave regulator, said one of said three windings and said another of said three windings being so disposed on the magnetic core member that the last of said three windings has a voltage induced thereacross which is only proportional to the measure of the current circulating between the master regulator and the slave regulator, master control means for selectively raising or lowering the output voltage of the master regulator, slave control means for selectively raising or lowering the output voltage of the slave regulator, and a control relay responsive to the output from said last of said three windings and so connected to control the operation of said master control means and said slave control means that when a predetermined magnitude of current circulates between the master regulator and the slave regulator said control relay effects a locking out of said master control means and causes an operation of said slave control means to bring the slave regulator in step with the master regulator.

3. In a control system for maintaining parallel operation between a master tap-changer transformer and a slave tap-changer transformer, the combination comprising, a current transformer for obtaining a measure of the output current of the master tap-changer transformer, another current transformer for obtaining a measure of the outpuut current of the slave tap-changer transformer, magnetic means including a magnetic core member and three windings disposed in inductive relationship with the magnetic core member, circuit means for rendering one of said three windings responsive to the measure of the output current of the master tap-changer transformer, other circuit means for rendering another of said three windings responsive to the measure of the output current of the slave tap-changer transformer, said one of said three windings and said another of said three windings being so disposed on the magnetic core member that the last of said three windings has a voltage induced thereacross which is only proportional to a measure of the current circulating between the master tap-changer transformer and the slave tap-changer transformer, master control means for selectively raising or lowering the output voltage of the master tap-changer transformer, slave control means for selectively raising or lowering the output voltage of the slave tap-changer transformer, and a control relay responsive to the output from said last of said three windings and so connected to control the operation of said master control means and said slave control means that when a predetermined magnitude of current circulates between the master tap-changer transformer and the slave tap-changer transformer, said control relay effects a locking out of said master control means and causes an operation of said slave control means to bring the slave tap-changer transformer in step with the master tap-changer transformer.

4. In a control system, the combination comprising, a master tap-changer transformer, a slave tap-changer transformer adapted for parallel operation with the master tap-changer transformer, a current transformer for obtaining a measue of the output current of the master tap-changer transformer, another current transformer for obtaining a measure of the output current of the slave tap-changer transformer, magnetic means including a magnetic core member and three windings disposed in inductive relationship with the magnetic core member, circuit means for rendering one of said three windings responsive to the measure of the output current of the master tap-changer transformer, other circuit means for rendering another of said three windings responsive to the measure of the output current of the slave tape-changer transformer, said one of said three windings and said another of said three windings being so disposed on the magnetic core member that the last of said three windings has a voltage induced thereacross which is only proportional to a measure of the current circulating between the master tap-changer transformer and the slave tap-changer transformer, master control means for maintaining the magnitude of the output voltage of the master tap-changer transformer substantially constant, slave control means for selectively raising or lowering the output voltage of the slave tap-changer transformer, and a control relay responsive to the output from said last of said three windings and so connected to control the operation of said master control means and said slave control means that when a predetermined magnitude of current circulates between the master tap-changer transformer and the slave tap-changer transformer, said control relay effects a locking out of said master control means and causes an operation of said slave control means to bring the slave tap-changer transformer in step with the master tap-changer transformer.

References Cited in the file of this patent

UNITED STATES PATENTS

| 1,373,923 | Unger | Apr. 5, 1921 |
| 2,772,369 | Pinney | Nov. 27, 1956 |

FOREIGN PATENTS

| 567,995 | Great Britain | Mar. 13, 1945 |